United States Patent
Branets et al.

(10) Patent No.: US 10,061,060 B2
(45) Date of Patent: Aug. 28, 2018

(54) METHOD AND APPARATUS FOR GENERATING A THREE-DIMENSIONAL SIMULATION GRID FOR A RESERVOIR MODEL

(75) Inventors: Larisa V. Branets, The Woodlands, TX (US); Elena Kartasheva, Alpharetta, GA (US); Igor V. Krasnogorov, Troitsk (RU); Valeriy Kubyak, Alpharetta, GA (US); Xiaohui Wu, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 519 days.

(21) Appl. No.: 13/498,256

(22) PCT Filed: Jul. 28, 2010

(86) PCT No.: PCT/US2010/043462
§ 371 (c)(1),
(2), (4) Date: Mar. 26, 2012

(87) PCT Pub. No.: WO2011/059535
PCT Pub. Date: May 19, 2011

(65) Prior Publication Data
US 2012/0215513 A1    Aug. 23, 2012

Related U.S. Application Data

(60) Provisional application No. 61/260,589, filed on Nov. 12, 2009.

(51) Int. Cl.
*G06G 7/50*    (2006.01)
*G01V 99/00*    (2009.01)

(52) U.S. Cl.
CPC ............ *G01V 99/00* (2013.01); *G01V 99/005* (2013.01)

(58) Field of Classification Search
CPC ........ E21B 49/00; E21B 43/00; E21B 43/164; E21B 43/166; G06F 17/5018;
(Continued)

(56) References Cited

U.S. PATENT DOCUMENTS 6,018,497 A * 1/2000 Gunasekera ............... 367/72
6,078,869 A   6/2000 Gunasekera
(Continued)

FOREIGN PATENT DOCUMENTS

EP            1 865 340        12/2007
WO      WO 2004/072741          8/2004
(Continued)

OTHER PUBLICATIONS

O' Sullivan et al. Geothermal reservoir simulation: The state of practice and emerging trends, 30 (2001) pp. 395-429 teaches chemical and physical simulation of reservoirs.*
(Continued)

*Primary Examiner* — Brian S Cook
(74) *Attorney, Agent, or Firm* — ExxonMobil Upstream Research Company-Law Department

(57) ABSTRACT

A method and apparatus for generating a simulation grid for a reservoir model based on a geological model comprising horizons, constraints and multiple geological grid cells. A pre-image is generated corresponding to the geological grid cells, the pre-image comprising a surface and the modeling constraints being mapped onto the surface. A constrained two-dimensional grid is generated on the pre-image, the two-dimensional grid comprising multiple grid cells. Simulation layer boundaries are selected from the geological model and the constrained two-dimensional grid is projected onto the simulation layer boundaries. Prismatic cells are then generated to form the three-dimensional simulation
(Continued)

grid. The method of generating a grid as herein described may be incorporated in existing reservoir simulators.

21 Claims, 8 Drawing Sheets

(58) Field of Classification Search
CPC .......... G06F 17/5009; G06F 2217/04; G06F 2217/16; G06F 2217/06; G06F 7/48; G06T 17/20; G06T 17/05; G06T 19/20; G06T 2207/10088; G06T 2207/20116; G06T 2207/30016; G06T 2219/2021; G06T 7/0083; G06T 7/0089; G01V 11/00; G01V 2210/663; G01V 99/00; G10V 99/00
USPC .......................................... 703/10; 345/423
See application file for complete search history.

(56) References Cited

U.S. PATENT DOCUMENTS

| | | | |
|---|---|---|---|
| 6,106,561 A * | 8/2000 | Farmer | 703/10 |
| 6,128,577 A | 10/2000 | Assa et al. | |
| 6,662,109 B2 | 12/2003 | Roggero et al. | |
| 6,674,432 B2 | 1/2004 | Kennon et al. | |
| 6,823,297 B2 | 11/2004 | Jenny et al. | |
| 6,826,520 B1 * | 11/2004 | Khan et al. | 703/10 |
| 6,907,392 B2 | 6/2005 | Bennis et al. | |
| 6,941,255 B2 | 9/2005 | Kennon et al. | |
| 6,980,940 B1 | 12/2005 | Gurpinar et al. | |
| 7,006,951 B2 | 2/2006 | Pond, Jr. et al. | |
| 7,027,964 B2 | 4/2006 | Kennon | |
| 7,043,413 B2 | 5/2006 | Ward et al. | |
| 7,047,165 B2 | 5/2006 | Balaven et al. | |
| 7,096,122 B2 | 8/2006 | Han | |
| 7,096,172 B2 | 8/2006 | Colvin et al. | |
| 7,149,671 B2 | 12/2006 | Lim et al. | |
| 7,200,533 B2 | 4/2007 | Hu et al. | |
| 7,200,540 B2 | 4/2007 | Colvin et al. | |
| 7,260,508 B2 | 8/2007 | Lim et al. | |
| 7,310,579 B2 | 12/2007 | Ricard et al. | |
| 7,369,973 B2 | 5/2008 | Kennon et al. | |
| 7,392,166 B2 | 6/2008 | Le Ravalec-Dupin et al. | |
| 7,426,460 B2 | 9/2008 | Noetinger et al. | |
| 7,451,066 B2 | 11/2008 | Edwards et al. | |
| 7,478,024 B2 | 1/2009 | Gurpinar et al. | |
| 7,496,488 B2 | 2/2009 | Jenny | |
| 7,546,229 B2 | 6/2009 | Jenny et al. | |
| 7,558,715 B2 | 7/2009 | Schaaf et al. | |
| 7,577,061 B2 | 8/2009 | Williamson et al. | |
| 7,584,081 B2 | 9/2009 | Wen et al. | |
| 7,742,875 B2 | 6/2010 | Li | |
| 7,904,248 B2 | 3/2011 | Li | |
| 8,150,663 B2 * | 4/2012 | Mallet | G01V 11/00 345/420 |
| 8,396,699 B2 | 3/2013 | Maliassov | |
| 2003/0216898 A1* | 11/2003 | Basquet et al. | 703/10 |
| 2005/0015231 A1* | 1/2005 | Edwards et al. | 703/10 |
| 2005/0120195 A1 | 6/2005 | Kumar | |
| 2005/0125203 A1* | 6/2005 | Hartman | G06T 17/20 703/1 |
| 2006/0058965 A1 | 3/2006 | Ricard et al. | |
| 2006/0184329 A1* | 8/2006 | Rowan et al. | 702/50 |
| 2006/0235667 A1 | 10/2006 | Fung et al. | |
| 2007/0073527 A1 | 3/2007 | Flandrin et al. | |
| 2007/0150244 A1 | 6/2007 | Senecal et al. | |
| 2007/0156377 A1 | 7/2007 | Gurpinar et al. | |
| 2007/0265815 A1 | 11/2007 | Couet et al. | |
| 2008/0091353 A1 | 4/2008 | Krumhansl et al. | |
| 2008/0167849 A1 | 7/2008 | Hales et al. | |
| 2008/0221845 A1 | 9/2008 | Yu et al. | |
| 2008/0288226 A1 | 11/2008 | Gurpinar et al. | |
| 2009/0006057 A1 | 1/2009 | Niu et al. | |
| 2009/0164187 A1 | 6/2009 | Habashy et al. | |
| 2009/0164188 A1 | 6/2009 | Habashy et al. | |
| 2009/0234625 A1 | 9/2009 | Zangl et al. | |
| 2009/0254324 A1* | 10/2009 | Morton et al. | 703/10 |
| 2009/0265152 A1 | 10/2009 | Cacas et al. | |
| 2012/0296619 A1 | 11/2012 | Maliassov et al. | |
| 2013/0035913 A1 | 2/2013 | Mishev et al. | |
| 2013/0090907 A1 | 4/2013 | Maliassov | |

FOREIGN PATENT DOCUMENTS

| | | |
|---|---|---|
| WO | WO 2006/034256 | 3/2006 |
| WO | WO 2008/036297 | 3/2008 |
| WO | WO 2008/150325 | 12/2008 |

OTHER PUBLICATIONS

Adamson et al. Simulation Throughout the Life of a Reservoir, Oilfield Review, 1996 pp. 16-27 teaches oilfield simulation and state variables.*

Mlacnick et al. Sequentially Adapted Flow-Based PEBI Grids for Reservoir Simulation SPE, Sep. 2006 SPE Journal pp. 317-327 teaches to do reservoir simulations with PEBI grids.*

Zimmer, H., Voronoi and Delaunay Techniques Jul. 30, 2005 teaches 3D to 2D projections/extrusions of surfaces.*

Ledoux, H., Modelling Three-dimensional Fields in Geoscience with the Voronoi Diagram and its Dual, Nov. 2006 teaches using Voronoi grids (PEBI) for geoscience problems including simulation, projection etc.*

Fremming, M.P., 3D Geological Model Construction Using a 3D Gid, 8th European Conference on the Mathematics of Oil Recovery, Sep. 2002 teaches horizons etc.*

Gunasekera, D., The Generation and Application of K-Orthogonal Grid Systems, SPE 1997.*

Wu, X.H., Reservoir Modeling with Global Scaleup, SPE, 2007.*

Heinemann, Z.E., Modeling Heavily Faulted Reservoirs, SPE, 1998.*

Areal: The American Heritage Dictionary of the English Language, Fourth Edition, 2000.*

Scheidt_2007, Scheidt C. & Caers J. (2007). A workflow for spatial uncertainty quantification using distances and kernels, Stanford Center for Reservoir Forecasting Annual Meeting.*

Scheidt_2008, Scheidt, C., Caers, J., Representing Spatial Uncertainty Using Distances and Kernels, Math Geosci (2009) 41: 397-419 DOI 10.1007/s11004-008-9186-0 Published online: Sep. 24, 2008.*

Thom, J. 3-D Grid Types in Geomodeling and Simulation—How the Choice of the Model Container Determines Modeling Results, AAPG, Search and Discovery Article #40477, Dec. 23, 2009.*

Barnets, L.V., A Variational Grid Optimization Method Based on a Local Cell Quality Metric, University of Texas at Austin, 2005.*

Durlofsky, L.J., Upscaling and Gridding of Fine Scale Geological Models for Flow Simulation, 8th International Forum on Reservoir Simulation Iles Borromees, Stresa, Italy, Jun. 20-24, 2005.*

Wu (Reservoir Modeling with Global Scale up).*

Gunasekera (The Generation and Application of K-Orthogonal Grid Systems).*

Branets_2009 (Challenges and Technologies in Reservoir Modeling, Communications in Computational Physics vol. 6, No. 1, pp. 1-23, Jul. 2009).*

Efendiev_2007 (Coarsening of three-dimensional structured and unstructured grids for subsurface flow, Elservier Science, Apr. 16, 2007).*

Branets, L.V. (2005), "A Variational Grid Optimization Method Based on a Local Cell Quality Metric", Dissertation, The University of Texas At Austin, 192 pgs.

Gu, J. et al. (2008), "Rapid Traversability Assessment in 2.5D Grid-based Map on Rough Terrain", *Int'l. J. of Advanced Robotic Systems* 5(4), pp. 389-394.

Ponting, D.K. (1985), "Corner Point Geometry in Reservoir Simulation", *British Library*, pp. 45-65.

Fremming, N.P. (2002), "3D Geological Model Construction Using a 3D Grid", 8th European Conf. on the Mathematics of Oil Recovery, Sep. 3-6, 2002, 7 pgs.

(56) References Cited

OTHER PUBLICATIONS

Branets, L.V., et al. (2009) "Challenges and Technologies in Reservoir Modeling", *Communications in Computational Physics*, vol. 6, No. 1, pp. 1-23.

Kuwauchi, Y., et al. (1996) "Development and Applications of a Three Dimensional Voronoi-Based Flexible Grid Black Oil Reservoir Simulator", SPE 37028-MS, Soceity of Petroleum Engineers, SPE Asia Pacific Oil and Gas Conference, Oct. 28-31, Adelaide, Australia, pp. 1-12.

* cited by examiner

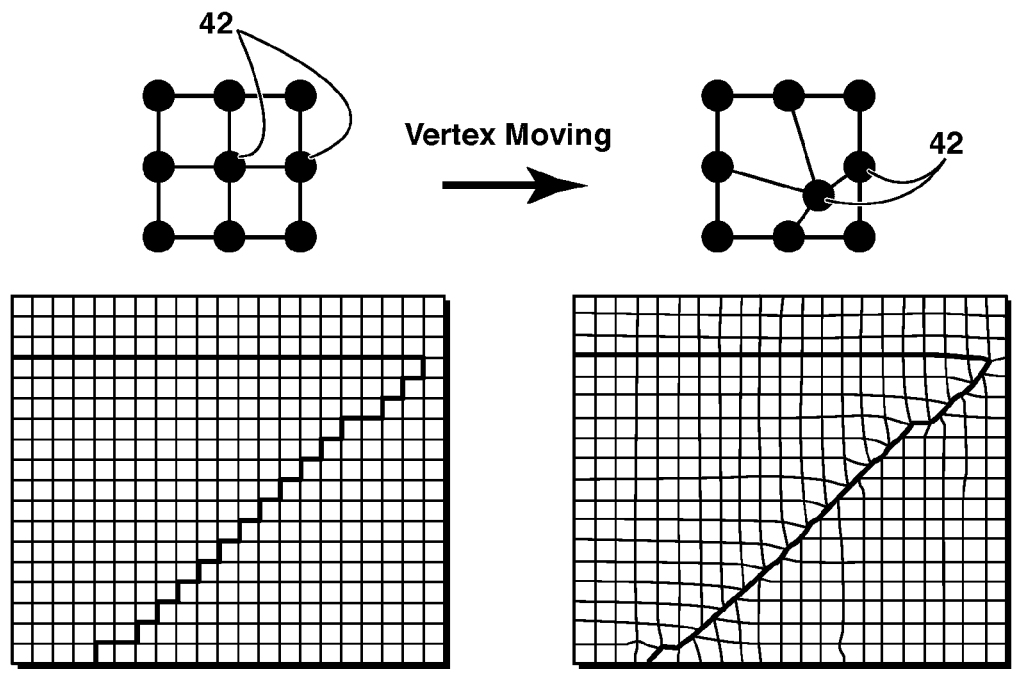
FIG. 4A  FIG. 4B
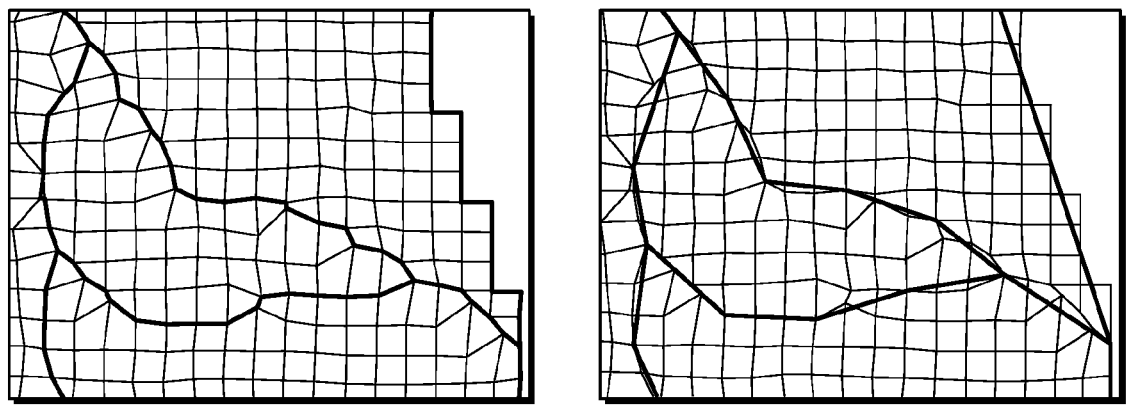
FIG. 5A  FIG. 5B

METHOD AND APPARATUS FOR GENERATING A THREE-DIMENSIONAL SIMULATION GRID FOR A RESERVOIR MODEL

CROSS REFERENCE TO RELATED APPLICATION

This application is the National Stage entry under 35 U.S.C. 371 of PCT/US2010/043462, that published as WO 2011/059535 and was filed on 28 Jul. 2010, which claims the benefit of U.S. Provisional Application No. 61/260,589, filed on 12 Nov. 2009, each of which is incorporated herein by reference, in its entirety, for all purposes.

FIELD

Aspects disclosed herein relate to a method and apparatus for reservoir modeling and/or reservoir simulation, particularly but not exclusively to a method and apparatus for generating a grid for a reservoir model.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, this section should be read in this light, and not necessarily as an admission of prior art.

Over the past few decades, numerous technological advances in the oil industry have increased the success rate of finding reserves, developing these and improving the hydrocarbon recovery from existing resources. In addition, advances in computing capabilities have enabled geologists and engineers to model the reservoirs with increasing accuracy. Various technologies have been developed to understand a prospective reservoir by providing geological and reservoir information at different scales varying from a few inches (for example in core plug analysis) to tens of meters horizontally and a few meters vertically (seismic imaging data).

Construction of reservoir models has become a crucial step in resource development as reservoir modeling allows the integration of all available data in combination with a geologic model. One of the challenges in reservoir modeling is accurate representation of reservoir geometry, including the structural framework which may include major depositional surfaces that are nearly horizontal (also known as horizons), fault surfaces which can have arbitrary spatial size and orientation, and detailed stratigraphic layers. FIG. 1 illustrates a complex reservoir geometry which contains multiple fault surfaces which deviate from the vertical direction.

A structural framework outlines the major components of the reservoir and it is often used to model the fluid volumes located in the reservoir and the fluid movement during production. It is therefore helpful for the structural framework to be modeled accurately. However, to date, modeling of structural frameworks for practical reservoir modeling has been hampered by difficulties in generating a suitable grid. Specific challenges in generating a grid for a structural framework arise from the complex structure of sub-surface reservoir geometries. The typical aspect ratio of reservoir dimensions (horizontal in relation to vertical dimensions) can be several orders of magnitude. As a consequence, the aspect ratio of the grid cells is usually between 10 and 100.

Prismatic or 2.5 D Voronoi grids, constructed by the projection or extrusion of a 2D Voronoi grid in a vertical or near vertical direction, are widely accepted for reservoir simulations (see, for example, WO 2008/150325). The prismatic grid cells can be easily constrained to resolve horizons or stratigraphic layer boundaries. Voronoi grids are much more flexible and adaptive than structured corner point grids which are commonly used in reservoir simulators. Voronoi grids generally require fewer grid cells to represent and simulate the geometry in comparison to conventional corner point grids. This reduces computing power requirements whilst the accuracy of the models is not compromised. However, in complex reservoir geometries where fault surfaces deviate from the vertical plane, generating an accurate constrained grid still poses problems and as a result, the accuracy of reservoir models for complex reservoir geometries is still compromised.

"Efficient and accurate reservoir modeling using adaptive gridding with global scale up", Branets et al., SPE 118946 (2009), discloses techniques for generating an adaptively constrained 2.5D Voronoi grid.

U.S. Pat. No. 6,106,561 discloses a simulation gridding method and apparatus including a structured area gridder adapted for use by a reservoir simulator. This disclosure is concerned with generating a 2.5D structured grid based on segmented coordinate lines. Coordinate lines are vertical or near vertical lines which approximate the fault surface geometry. An areal 2D grid is projected along the coordinate lines to form a 2.5D prismatic grid. This gridding method cannot cope with complex system of faults or highly-deviated (from vertical) faults, as this results in unacceptable grids with inside-out cells and vertices outside of the model domain. Also, structured grids generally require a lot of computing power for solving the reservoir model, and therefore, these grids are unsuitable for the simulation of large reservoirs comprising multiple structural faults.

"Challenges and technologies in reservoir modeling", Branets et al., Communications in Computational Physics, Volume 6, Number 1, pages 1-23, discloses an overview of the technology in reservoir modeling, grid generation, grid adaptation and global scale-up methods to date.

Aspects disclosed herein aim to obviate or at least mitigate the above described problems and/or to provide improvements generally.

SUMMARY

A method is provided as defined in any one of the accompanying claims.

In particular, there is provided a method of generating a three-dimensional simulation grid for a reservoir model comprising: providing a geological model comprising horizons, constraints and multiple geological grid cells; constructing a pre-image corresponding to the geological grid cells, said pre-image comprising a surface, said modeling constraints being mapped onto said surface; generating a constrained two-dimensional grid on the pre-image, the two-dimensional grid comprising multiple grid cells; selecting simulation layer boundaries from said geological model and projecting the constrained two-dimensional grid onto said simulation layer boundaries; generating prismatic cells to form the three-dimensional simulation grid; and outputting the three-dimensional simulation grid.

The grid is thus effectively constructed from a pre-image containing the constraints from the geological model. This enables faults to be accurately represented by the grid.

According to aspects and methodologies, the pre-image may be constructed by selecting a parametric space corresponding to a base horizon. The parametric space may comprise multiple vertices. The vertices may be moved to correspond with the location of the constraints in the geological model. The constraints may be approximated in the three-dimensional space of a geological model and the constraints may be mapped onto the pre-image. The pre-image may be adjusted to match the constraints. Edges of the pre-image grid are matched to the corresponding constraints on the pre-image. The pre-image may be constructed by defining a continuous base horizon surface across one or more faults, smoothing the continuous base horizon, and projecting the continuous base horizon onto a plane to form the pre-image, the pre-image including multiple vertices. Fault vertices of the base horizon may be merged to locate the fault vertices on the continuous base horizon. The fault vertices on the continuous base horizon surface may be located equidistant from the fault intersections of the base horizon on either side of the fault. The continuous base horizon may be smoothed by moving one or more vertices in a k-direction of the geological model. The base horizon may be projected vertically onto the plane to form the pre-image. The constrained two-dimensional grid may be generated on the pre-image. The two-dimensional grid cells may include identifiers corresponding to the grid cells of the geological model. The grid cells may be projected along k direction lines of the geological grid cells. The constraints may include internal constraints and/or external constraints, the constraints including modeling constraints for simulation grid generation representing subsurface reservoir elements. The internal constraints may be included in the geological model. The external constraints may include modeling constraints ancillary to the geological model. Hydrocarbons in a hydrocarbon reservoir may be managed using the three-dimensional simulation grid.

In another embodiment, there is provided a simulation gridding apparatus for generating a grid for a reservoir model comprising the following features, which may be computer-based: a geological model comprising horizons, constraints and multiple geological grid cells; a pre-image corresponding to the geological grid cells, said pre-image comprising a surface, the modeling constraints being mapped onto the surface; a generator for generating a constrained two-dimensional grid on the pre-image, the two-dimensional grid comprising multiple grid cells; a selector for selecting simulation layer boundaries from the geological model and a projector for projecting the constrained two-dimensional grid onto the simulation layer boundaries; a generator for generating prismatic cells to form the three-dimensional simulation grid; a transferor for transferring reservoir properties to the three-dimensional simulation grid; a definer for defining state variables and/or state parameters for each grid cell in the three-dimensional simulation grid; and a solver for simulating physical and chemical processes related to hydrocarbon production on the three-dimensional simulation grid.

According to methodologies and techniques, the two-dimensional grid cells may include identifiers corresponding to the grid cells of the geological model. The constraints may include at least one of internal constraints and external constraints. The internal constraints may include modeling constraints for simulation grid generation representing subsurface reservoir elements. The external constraints may include modeling constraints ancillary to the reservoir.

A reservoir simulator is provided. The reservoir simulator includes a gridding apparatus having: a geological model comprising horizons, constraints and multiple geological grid cells; a pre-image corresponding to the geological grid cells, the pre-image comprising a surface, the modeling constraints being mapped onto the surface; a generator for generating a constrained two-dimensional grid on the pre-image, the two-dimensional grid comprising multiple grid cells; simulation layer boundaries selected from the geological model and a projector for projecting the constrained two-dimensional grid onto said simulation layer boundaries; and a generator for generating prismatic cells from the two-dimensional grid to form the three-dimensional simulation grid. The reservoir simulator also includes computer based transfer means for transferring reservoir properties to the three-dimensional simulation grid, and a solver for simulating physical and chemical processes related to hydrocarbon production on the three-dimensional simulation grid based on state variables and/or state parameters for each grid cell in the three-dimensional simulation grid.

A program storage device is provided. The program storage device is readable by a machine and tangibly embodying a program of instructions executable by the machine. The instructions include: code for providing a geological model comprising horizons, constraints and multiple geological grid cells; code for constructing a pre-image corresponding to the geological grid cells, said pre-image comprising a surface, said modeling constraints being mapped onto said surface; code for generating a constrained two-dimensional grid on the pre-image, the two-dimensional grid comprising multiple grid cells; code for selecting simulation layer boundaries from said geological model and projecting the constrained two-dimensional grid onto said simulation layer boundaries; and code for generating prismatic cells from the two-dimensional grid to form the three-dimensional simulation grid.

BRIEF DESCRIPTION OF THE DRAWINGS

Disclosed aspects and their advantages will now be described in more detail by way of example only and with reference to the accompanying drawings in which

FIGS. 4A and 4B show a pre-image modification;

FIGS. 5A and 5B show the simplification of original constraints into simplified constraints;

DETAILED DESCRIPTION

Figure 1:
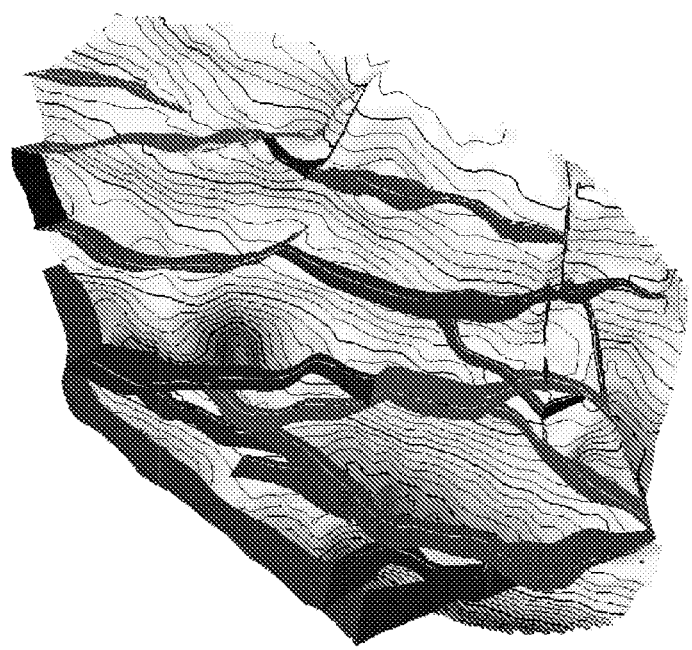
FIG. 1 shows a diagrammatic view of a complex structural framework of a reservoir.

To the extent the following description is specific to a particular embodiment or a particular use, this is intended to be illustrative only and is not to be construed as limiting the scope of the invention. On the contrary, it is intended to cover all alternatives, modifications, and equivalents that may be included within the spirit and scope of the invention.

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "providing", "constructing", "generating", "selecting", "projecting", "moving", "calculating", "modeling", "transferring", "defining", "solving", "simulating", "forming", "performing", "mapping", "outputting", "approximating", "adjusting", "matching", "smoothing", "merging", "locating", "assigning", "managing", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

At the outset, and for ease of reference, certain terms used in this application and their meanings as used in this context are set forth. To the extent a term used herein is not defined below, it should be given the broadest definition persons in the pertinent art have given that term in at least one printed publication or issued patent.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "exemplary" is used exclusively herein to mean "serving as an example, instance, or illustration." Any aspect described herein as "exemplary" is not necessarily to be construed as preferred or advantageous over other aspects.

As used herein, "hydrocarbon reservoirs" include reservoirs containing any hydrocarbon substance, including for example one or more than one of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein, "geological model" is a representation of the subsurface earth volume in three dimensions. The geological model is preferably represented by a structured three-dimensional grid. The geological model may be computer-based.

As used herein, "pre-image" is a surface representative of the areal geometry of a geological model.

As used herein, "grid cell" or "3D grid cell" is a unital block that defines a portion of a three-dimensional reservoir model. As such, a three-dimensional reservoir model may include a number of grid cells, ranging from tens and hundreds to thousands and millions of grid cells. Each grid cell may represent a specifically allocated portion of the three-dimensional reservoir model. An entire set of grid cells may constitute a grid which forms a geologic model that represents a sub-surface earth volume of interest. Each grid cell preferably corresponds to a portion of the sub-surface.

As used herein, a "grid" is a set of grid cells.

As used herein, "constraints" are conditions for choosing the data elements in which designated areas of interest can be identified. The constraints comprise modeling constraints for simulation grid generation which represent features of the subsurface reservoir that are important for flow simulation and, consequently, should be incorporated into the simulation model. The constraints consist of internal constraints and external constraints. Internal constraints comprise faults, model boundaries, and horizons. External constraints comprise modeling constraints for simulation grid generation which are ancillary to the geological model. External constraints comprise wells and areal polylines.

As used herein, a "constrained grid" is a grid which complies with the modeling constraints. For example, a grid constrained to a fault should accurately represent a fault surface with grid cell faces, i.e. some of the grid cell faces are constrained to lie on a fault surface.

As used herein, a "structured grid" is a grid in which each cell can be addressed by indices in two dimensions (i,j) or in three dimensions (i,j,k). All cells of a structural grid have a similar shape and the same number of vertices (nodes), edges and faces. In this way, the topological structure of the grid (i.e., boundary and adjacency relationships between cells, faces, edges, and vertices) is fully defined by the indexing (e.g., cell (i,j) is adjacent to cells (i+n,j+m) with n=−1,1 for m=0 and m=−1,1 for n=0). The most commonly used structured grids are Cartesian or radial grids in which each cell has four edges in two dimensions or six faces in three dimensions.

As used herein, an "unstructured grid" is a grid which does not have a regular (indexing) structure, so its topological relationships (boundary, adjacency, etc.) have to be stored, e.g. connectivity matrices provide for each cell lists of its faces, edges, and vertices. Unstructured grid cells may or may not be of similar geometric shape.

As used herein, a "horizon" is a horizontal section or time slice of the 3D volume of geological data.

As used herein, a "zone" is a volume between two horizons and some lateral boundaries which may or may not coincide with the model boundaries.

As used herein, a "prismatic cell" is a three-dimensional cell which is constructed by projection or extrusion of a two-dimensional cell, i.e., n-sided polygon in the third dimension to form a polyhedron. The resulting polyhedron has two n-sided polygonal faces connected by n parallelogram faces.

As used herein, a "parametric space" is the indexing space of a structured grid.

As used herein, a "node" is a point in a grid where continuity of mass and momentum is conserved.

As used herein, a "fault" is a break in the earth layer and the horizons surfaces, across which there is observable displacement.

As used herein, "smoothing" refers to modifying the placement of one or more vertices to improve a grid without modifying the grid connectivity.

This disclosure solves the problem of generating a three-dimensional unstructured grid in the three-dimensional domain with internal features to enable more accurate modeling of faults, boundaries and other constraints of the structured framework. The improved accuracy of the grid with respect to these elements in turn enhances the resolution of faults, boundaries and their intersections in conventional reservoir models.

Traditionally, geological models have consisted of maps, and, given a geological model, a simulation model was constructed from the geological model. However conventionally, reservoir engineers would directly modify the simulation model rather than update the underlying geological model. Many different algorithms have been proposed to perform the gridding task automatically. However, to date, none of the conventional gridding models are adapted to provide adequate resolution to allow simulation of faults in sub surface reservoirs adequately. Today there is a growing demand for a better and more integrated approach to reservoir modeling.

Figure 2:
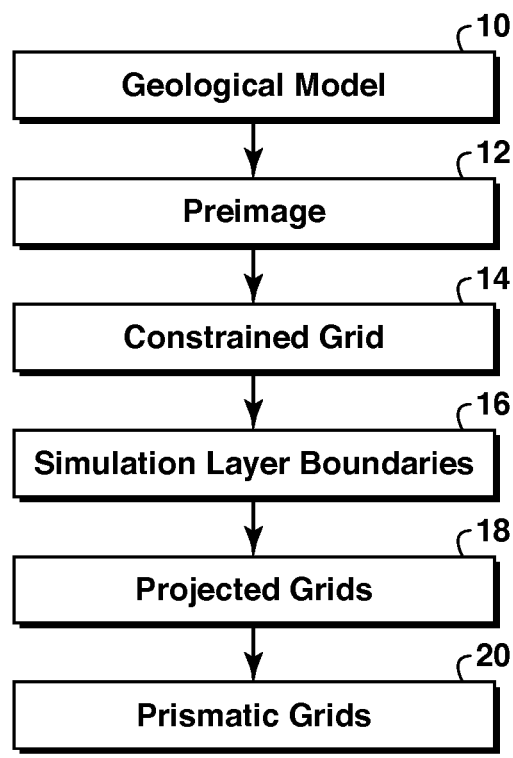
FIG. 2 shows a diagrammatic flow chart of the method steps according to disclosed aspects.

According to disclosed methodologies and techniques, a grid for a reservoir model is generated in a number of steps as illustrated in FIG. 2. First, a geological model is provided (10) which comprises horizons, constraints and multiple geological grid cells. A pre-image is constructed which corresponds to the geological grid cells (12). The pre-image comprises a two-dimensional surface, and the modeling constraints from the geological model are mapped onto the two-dimensional surface. A constrained two-dimensional grid is generated on the pre-image (14), the two-dimensional grid comprising multiple constrained grid cells. Simulation layer boundaries are selected based on the geological grid cells and/or horizons in the geological model to define partitioning of the space between the horizons (16). The constrained two-dimensional grid is projected onto the simulation layer boundaries (18); and prismatic cells are generated to form the grid (20).

The disclosed methodologies and techniques may be computer based in the form of a program or software. The improved gridding methods as disclosed support the iterative process of modifying the underlying geological model and of accommodating modifications to the simulation model more quickly than is currently possible.

Disclosed aspects provide a method of generating a grid for the reservoir model which comprises multiple geological grid cells and multiple horizons and constraints. The first step is to construct a pre-image which comprises a two-dimensional surface in a three-dimensional space having all modeling constraints mapped onto the pre-image. A constrained two-dimensional grid is generated on the pre-image to form a two-dimensional grid comprising multiple grid cells. Different two-dimensional grids can be generated on the same pre-image for different zones of the model based on each zone's rock properties and constraints. Each constrained two-dimensional grid is then mapped or projected onto a simulation layer boundary or horizon within the zone to which it is assigned and prismatic cells are generated for each zone. The prismatic cells which are below the pinch-out threshold based on thickness or volume may be merged geometrically to neighboring prismatic cells during prismatic cell generation. Split prismatic cell faces are computed along fault surfaces and on the zone bounding horizons between two mapped two-dimensional grids from corresponding zones, which finalizes generation of a three-dimensional grid for the entire model. Having different areal grids in different zones of the model allows a more accurate accounting for vertical variation in areal trends of rock and fluid properties, as well as for incorporating engineering features such as wells and other constraints locally within one zone.

A feature of the disclosed methodologies and techniques is the construction of a pre-image which comprises all the modeling constraints including faults and reservoir boundaries and which are all mapped onto it. Since the pre-image is used as an input for two-dimensional area gridding, the pre-image must accurately represent the real three-dimensional geometry of the horizons, faults and other constraints.

In another aspect, there is provided a method of constructing a pre-image by selecting a parametric space corresponding to a base horizon, the parametric space comprising a two-dimensional indexing grid. The base horizon is selected on the basis of the complexity of the horizons and may cover the entire areal extent of the reservoir model.

Figure 3A:
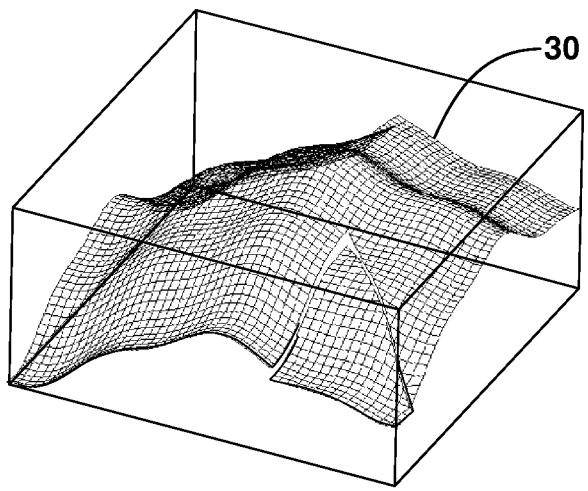
FIGS. 3A-3C show a diagrammatic view of a base horizon, its corresponding parametric space, and its final pre-image.
Figure 3B:
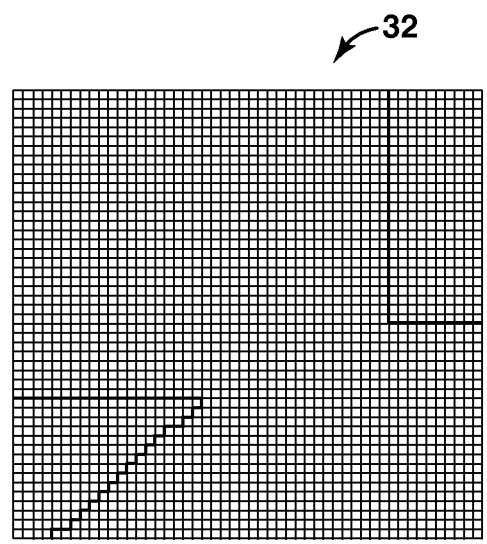
Figure 3C:
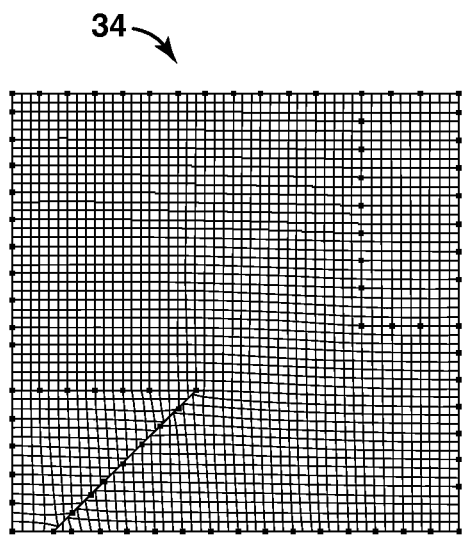

Being a two-dimensional (i,j) indexing space, the parametric space grid reflects the topology of the grid representing the base horizon. To ensure accurate representation of real geometry of the model, the vertices of the parametric space grid are moved to correspond to the location of the constraints in the geological model. As the location of the vertices corresponds to the location of the constraints in the model, this ensures accurate modeling of the faults as the grid is positioned such that faults are adequately covered by the grid structure. This results in improved resolution of the model with respect to the faults. In FIG. 3A, a base horizon 30 is shown. FIG. 3B depicts the corresponding parametric space 32, and FIG. 3C shows the final pre-image 34 which is constructed by moving the vertices or nodes to correspond with the location of the constraints in the base horizon of the geological model.

The pre-image is constructed by modifying the parametric space grid by vertex movement to achieve consistency with the original geometry of the constraints on the three-dimensional horizon surface of the geological model. This is illustrated in FIG. 4A, which presents a pre-image comprising a constraint corresponding to a fault. FIG. 4B is a modified pre-image comprising a modified constraint by vertex movement. The vertices 42 representing constraints in the pre-image are moved to eliminate a stair-stepping effect of the parametric space grid. The vertex movement is localized within a patch of adjacent cells, and causes local distortion of the pre-image cells. The vertex movement is performed automatically.

The constraints are represented on a fine scale in the geological model. To ensure efficient use of computing time, the grid corresponding to the constraints is preferably simplified and approximated on the coarse scale of the simulation grid cells. This simplification reduces the number of grid points. In one aspect, the number of grid points may be reduced selectively to ensure adequate model resolution in fault areas and/or other areas of interest. The constraints may be simplified or approximated in a three-dimensional space on the surface of the base horizon. Following simplification or approximation, the constraints are mapped onto the pre-image. The effect of the approximation is illustrated in FIG. 5A, which shows the constraints in the pre-image before simplification. FIG. 5B shows the constraints after simplification.

Figure 6A:
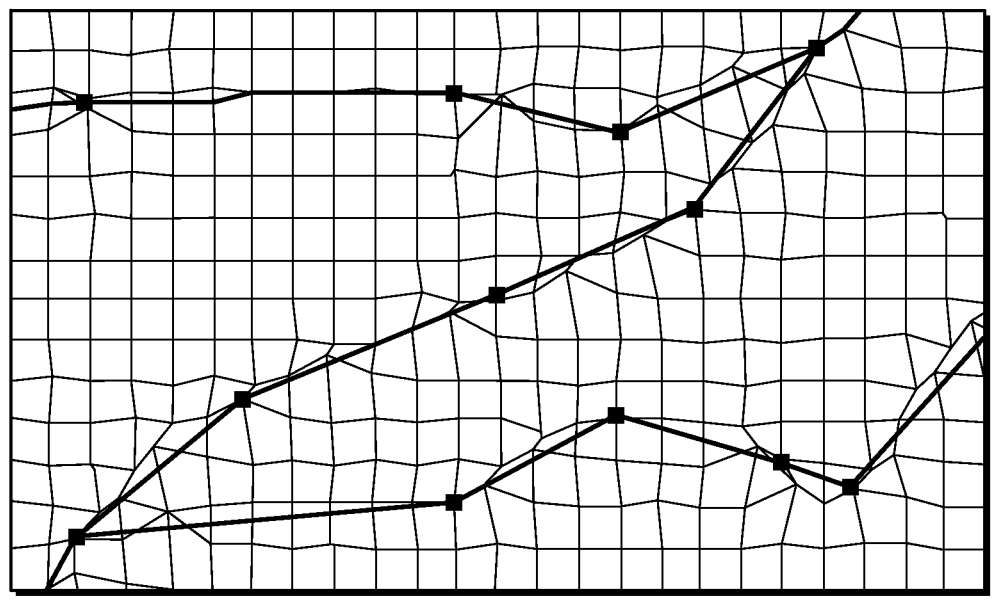
FIGS. 6A and 6B show the modification of an original pre-image by coinciding constraint edges of the parametric space with the simplified constraints of the pre-image.
Figure 6B:
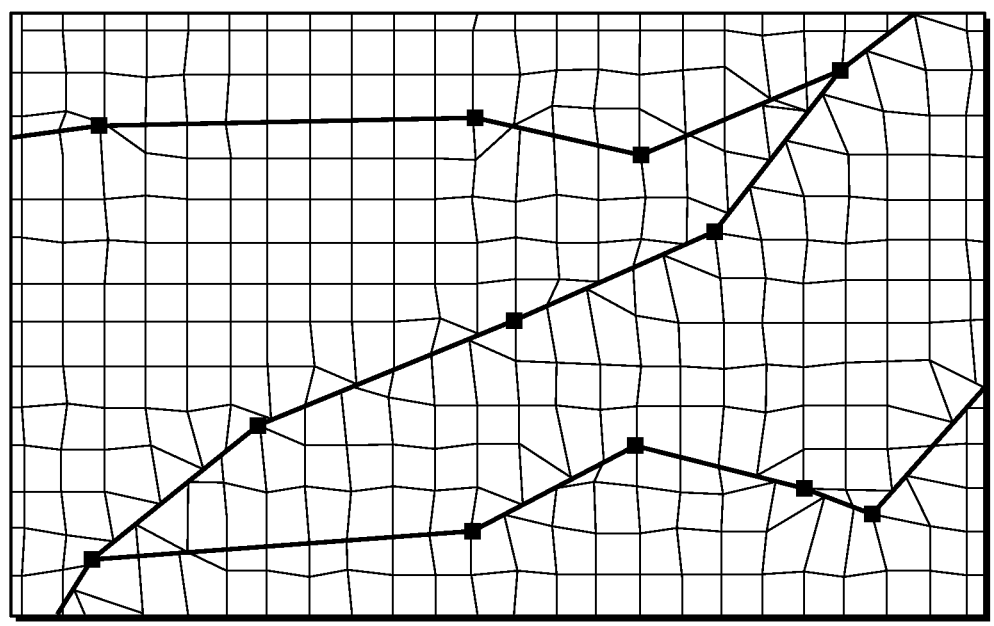

However, the coarsely approximated constraints may not be fully consistent with the fine-scale representation of the constraints by the edges of the pre-image grid. Therefore, adjustment of the pre-image may be done to improve the accuracy of the grid and the subsequent simulation results. For this purpose, constraint edges of the parametric grid are forced to coincide with the coarse constraint geometry of the pre-image. This is illustrated in FIGS. 6A and 6B. FIG. 6A presents the parametric grid and FIG. 6B presents the modified parametric grid in which the constraint edges are forced to coincide with a new coarse constraint geometry on the pre-image. The modified parametric grid may be further smoothed to minimize cell distortion.

To summarize, a base horizon from the geological model provides the basis for a pre-image through its parametric space. Once the pre-image is obtained, the pre-image is modified to represent the constraints which correspond to the three-dimensional geometry. The parametric space of the pre-image is modified by vertex movement to achieve consistency with the original geometry of the constraints in the horizon. In the geological model, the constraints are represented on a fine scale. To simplify and approximate this scale on the coarser scale of the simulation grid cells, the constraints are simplified in the three-dimensional space of the base horizon and they are subsequently mapped onto the pre-image. Following this step, the pre-image is adjusted to ensure consistency with the approximated constraints, by forcing constrained edges of the space to coincide with the modified coarse constraints geometry on the pre-image.

In a further embodiment, the pre-image may be constructed by defining a continuous base horizon surface across a fault and forming a pre-image surface based thereon. The continuous base horizon may be smoothed and then projected onto a plane to form the pre-image. This is an alternative way of constructing the pre-image which also results in an improved grid resolution around the faults in the geological model.

Figure 7A:
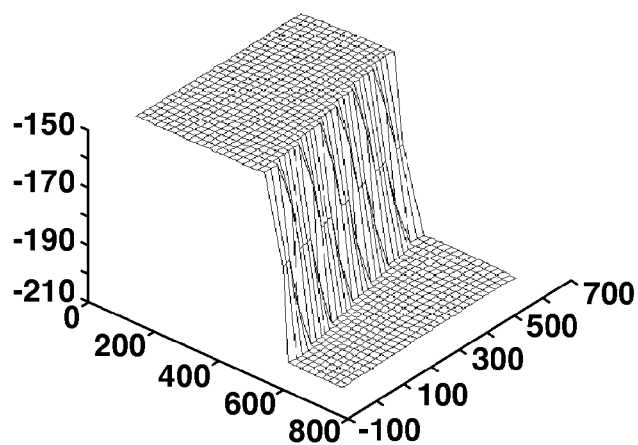
FIGS. 7A and 7B show a base horizon and its vertical projection or pre-image.
Figure 7B:
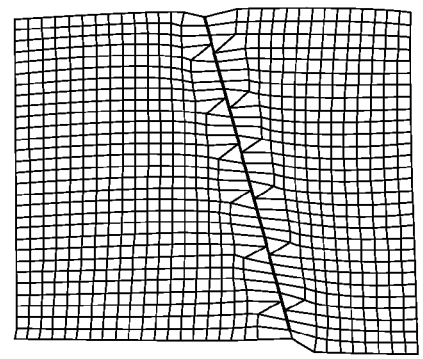

The base horizon is considered to be a continuous surface across the fault as illustrated in FIG. 7A to form a pre-image surface. The corresponding fault vertices of the base horizon grid on the two sides of the fault are merged and located on the pre-image to place these on the middle trace of the fault which is at an equidistant location from the unmodified grid on either side of the fault. As the base horizon is considered to be a continuous surface across the fault, the fault vertices join up the surface. Vertical projection of the continuous base horizon is shown in FIG. 7B.

Figure 8A:
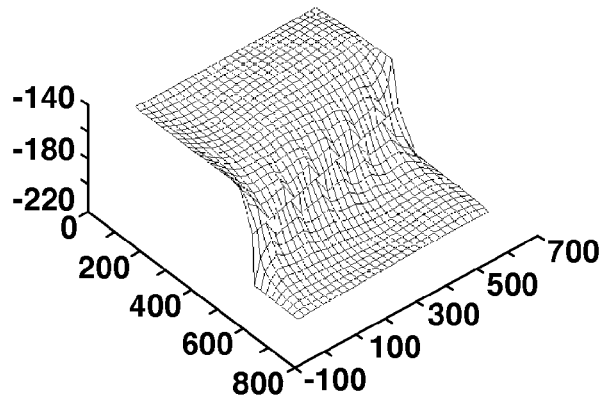
FIGS. 8A and 8B show a smoothed pre-image surface and its vertical projection or pre-image.
Figure 8B:
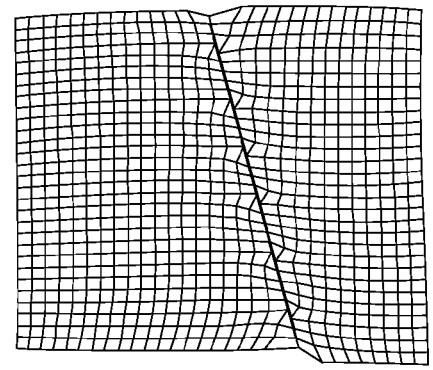

The projection may not be useful as a pre-image since it is a highly non uniform grid as evidenced by the elongated cells near the fault. If the fault is a reverse fault, the cells can even be folded. To achieve an acceptable pre-image in the vertical projection, the two-dimensional grid of the pre-image surface is smoothed and unfolded. During smoothing, the grid vertices are allowed to move in three-dimensional directions but only along the k directions of the geological model grid (along the pillars). This can be achieved by using a global smoothing technique such as the technique which is described in "A variational grid optimization method based on local cell quality metric", Branets L V, PhD thesis, University of Texas, 2005. The resulting smooth pre-image is shown in FIG. 8A, which presents the smooth pre-image surface. FIG. 8B shows the vertical projection of the smooth pre-image surface which forms the pre-image.

Once the pre-image is constructed, a constrained two-dimensional grid is constructed on it. Various known techniques for constructing the grid may be applied. For example, the grid may be constructed by approximating the boundaries and internal features of the pre-image with polylines, constructing an unconstrained grid by Delaunay triangulation for the image, modifying the Delaunay triangulation to conform triangle sides to the polylines, and correcting the modified constrained triangulation to bring it in line with the constraints.

Figure 9A:
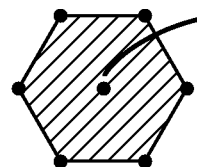
FIGS. 9A-9E show the projection of a two-dimensional grid onto a simulation layer boundary.
Figure 9B:
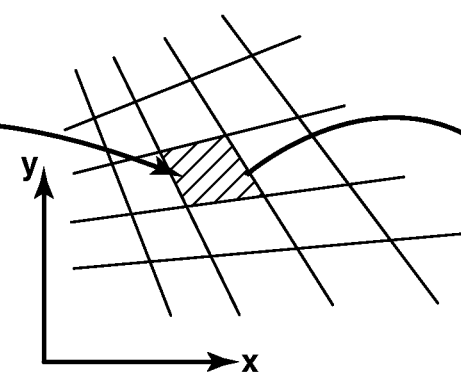
Figure 9C:
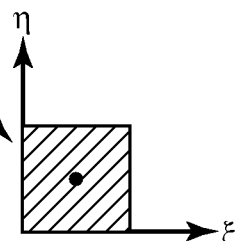
Figure 9D:
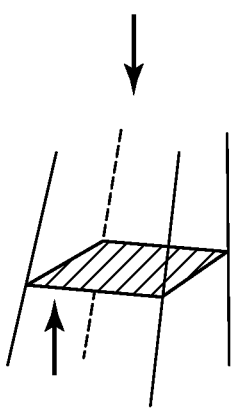
Figure 9E:
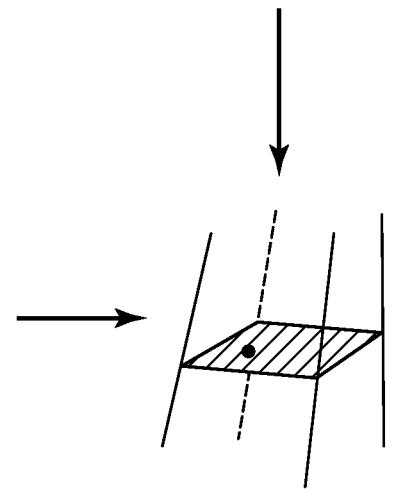

WO2008/150325 discloses further details on the generation of a constrained two-dimensional grid. To further improve consistency between the two-dimensional grid and the actual three-dimensional horizon geometry, it may be preferable to use curvature information of a base horizon for two-dimensional grid generation on the pre-image. The constrained two-dimensional grid is then projected on the simulation layer boundaries or horizons. Simulation layer boundaries are chosen based on the horizons and/or grid cells of the geological model to subdivide the volume between the horizons into the layers of the simulation grid. For each volume bounded by two horizons, the simulation layer boundaries can be defined by specifying top-conforming, bottom-conforming, or proportional layering style where the simulation layer boundaries will correspondingly repeat the shape of the top horizon, bottom horizon, or divide the volume proportionally. Alternatively, simulation layer boundaries can be defined in terms of layers of geological grid cells by specifying the geological grid layers which are to be combined into one simulation layer. The layers are preferably stacked in the k-direction. FIGS. 9A-9E illustrate the projection of a cell of the constrained two-dimensional grid onto a simulation layer boundary. FIG. 9A shows a grid cell which includes a cell centre. The constrained two-dimensional grid is constructed on the pre-image, and, therefore, for each vertex and cell centre of the constrained two-dimensional grid there can be determined a cell of the pre-image containing this vertex (FIG. 9B) and local coordinates $\xi$, $\eta$ of this vertex within the pre-image cell (FIG. 9C). Since the pre-image is formed from the parametric space of the base horizon, the cells of the pre-image can be uniquely identified with the k-columns of cells in the structured grid of the geological model. Within each of these k-columns the simulation layer boundaries have been identified (FIG. 9D). Therefore, using the pre-image cell (FIG. 9B) and local coordinates within it (FIG. 9C), each vertex or cell centre of each constrained grid cell (FIG. 9A) can be projected to all simulation layer boundaries within the corresponding k-column of the geological model grid cells (FIG. 9E).

Once the two-dimensional grid is projected onto all the simulation layer boundaries, the prismatic grid cells may be constructed by using conventional techniques. For example, the prismatic cells may be generated column by column by connecting faces of cells which have corresponding column numbers. Prismatic cells which are below the pinch-out threshold based on thickness or volume may be merged geometrically to neighboring prismatic cells during prismatic cell generation. Split prismatic cell faces are computed along fault surfaces and on the zone bounding horizons if the grid is generated by zones using a separate constrained two-dimensional grid for each zone.

Projection of areal simulation grid along the k-columns of the geological model grid ensures improved consistency between the resulting simulation grid and underlying geological model. For example, it facilitates transfer of the rock and fluid properties from the geological model onto the simulation grid by providing a more accurate and efficient way for evaluating geometrical containment relationships between simulation grid cells and geological model cells. In this way, a pre-image is constructed to accurately approximate the three-dimensional geometry of the base horizon and model constraints, and coordinate lines from the geological model are used as projection directions. This ensures consistency between the simulation and geological models, in contrast to conventional methods, where the pre-image is derived as a horizontal plane onto which constraints from the horizon or base model are projected vertically. Conventional methods can therefore not handle complex deviated faults or reverse faults.

Figure 10:
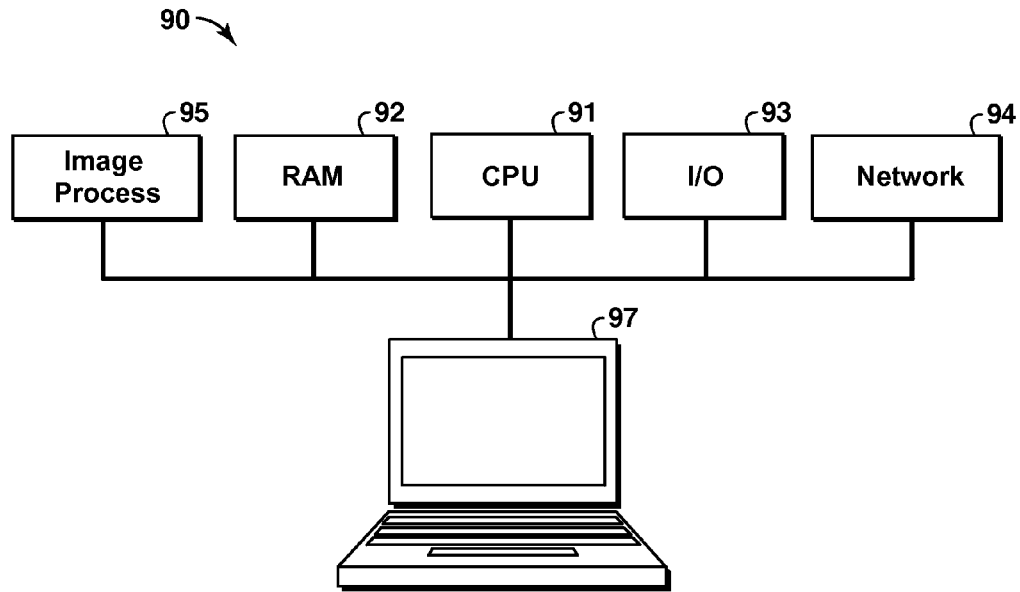
FIG. 10 is a block diagram illustrating a computer environment.

FIG. 10 illustrates a computer system 90 on which software for performing processing operations relating to aspects of the disclosed methodologies and techniques may be implemented. A central processing unit (CPU) 91 is coupled to the system. CPU 91 may be any general purpose CPU or application-specific CPU. The disclosed aspects are not restricted by the architecture of CPU 91 or other components of computer system 90. The CPU may execute the various logical instructions for performing processing according to the exemplary operational flow described in conjunction with methods disclosed herein. For example, CPU 91 may execute machine-level instructions, or machine-readable code, for performing operational blocks or steps of FIG. 2 herein.

Computer system 90 may include one or more machine-readable media such as random access memory (RAM) 92. RAM 92 may hold user and system data and programs, such as a computer program product containing code effectuating methods of the aspects, methodologies and techniques disclosed herein. The computer system also includes an input-output (I/O) adapter 93, a network adapter 94, and an image processing adapter/card 95. Computer system 90 may also include an output device, such as a printer or display 97, to display or otherwise visually provide results of one or more portions of the disclosed methods.

Figure 11:
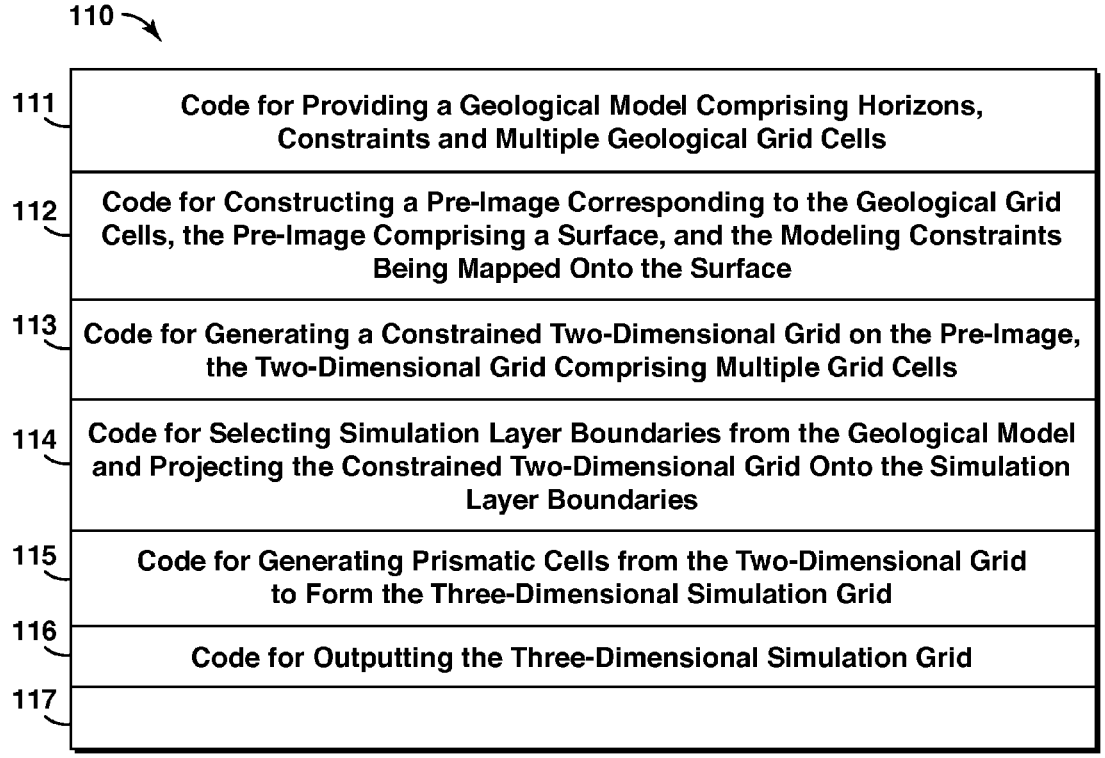
FIG. 11 is a block diagram of machine-readable code.

FIG. 11 depicts a representation of a tangible machine-readable medium 110 incorporating machine-readable code that may be used with a computing system such as computing system 90. At block 111 code is provided for providing a geological model comprising horizons, constraints and multiple geological grid cells. At block 112 code is provided for constructing a pre-image corresponding to the geological grid cells, the pre-image comprising a surface, and the modeling constraints being mapped onto the surface. At block 113 code is provided for generating a constrained two-dimensional grid on the pre-image, the two-dimensional grid comprising multiple grid cells. At block 114 code is provided for selecting simulation layer boundaries from the geological model and projecting the constrained two-dimensional grid onto the simulation layer boundaries. At block 115 code is provided for generating prismatic cells from the two-dimensional grid to form the three-dimensional simulation grid. At block 116 code may be provided for outputting the three-dimensional simulation grid. Code effectuating or executing other features of the disclosed aspects and methodologies may be provided as well. This additional code is represented in FIG. 11 as block 117, and may be placed at any location within the machine-readable code according to computer code programming techniques.

Aspects disclosed herein may be used to perform hydrocarbon management activities. For example, the method of generating a grid as herein described may be incorporated in existing reservoir simulators to improve the accuracy of existing reservoir models. In reservoir simulators, mathematical equations describing the physical flow of fluids in the reservoir are numerically solved using a computer. The equations may generally be ordinary differential equations and/or partial differential equations. As a means for numerically solving such equations, there are known finite element methods, finite difference methods, finite volume methods and the like. Regardless of which method is used to numerically solve the model equations, a grid is generated as hereinbefore described based on the physical system or geological model, and the state variables that vary in space throughout the model are represented by sets of values for each cell. State variables relating to reservoir rock properties such as porosity and permeability are typically assumed to be constant inside a grid cell. Other variables such as fluid pressure and phase saturation are specified at specified points which are herein called "nodes", within the cell. A reservoir model and a reservoir simulator thereby may be derived from a geological model by generating a grid as hereinbefore described, up-scaling or transferring the properties of the geological model to the generated grid, defining state variables and/or state parameters for each grid cell in the grid, and solving the grid using an appropriate solver to simulate the flow of hydrocarbons in the grid over time in accordance with the boundary conditions to the reservoir.

Figure 12:
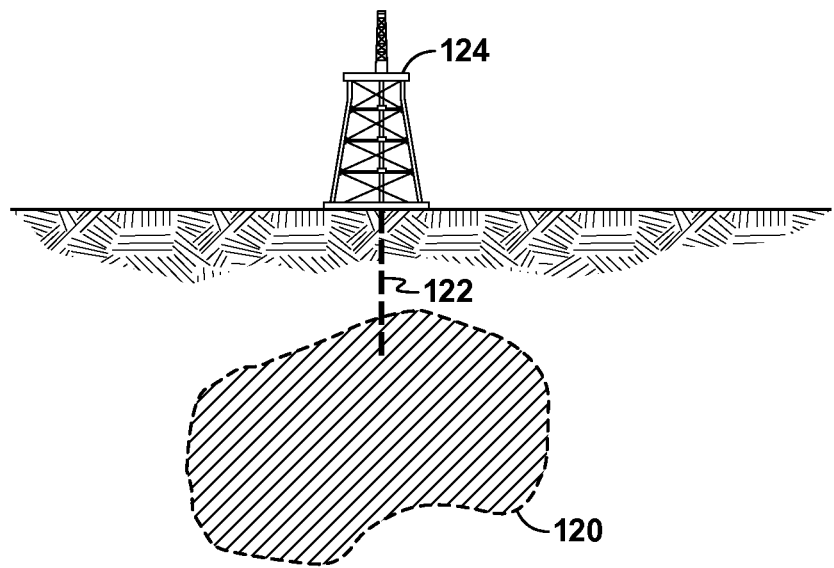
FIG. 12 is a side elevational view of a hydrocarbon management activity.
Figure 13:
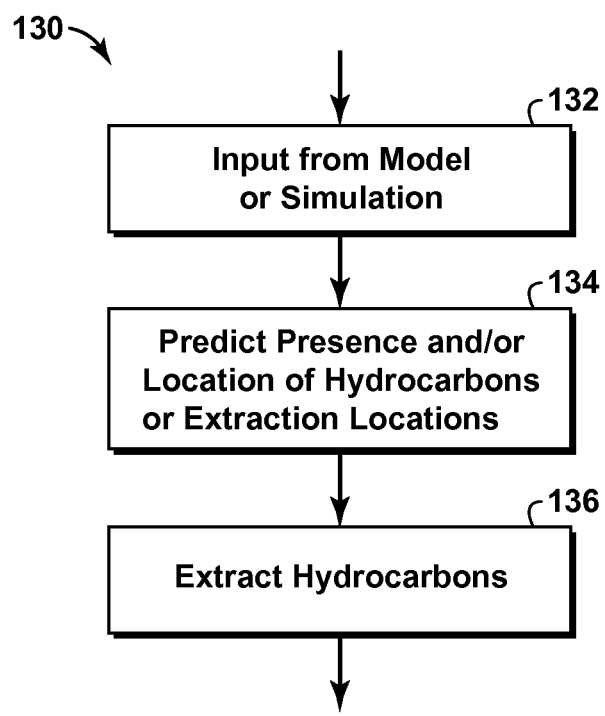
FIG. 13 is a flowchart of a method of extracting hydrocarbons from a subsurface region.

As another example of hydrocarbon management activities, aspects disclosed herein may be used to assist in extracting hydrocarbons from a subsurface region or reservoir, which is indicated by reference number 120 in FIG. 12. A method 130 of extracting hydrocarbons from subsurface reservoir 120 is presented in FIG. 13. At block 132 inputs are received from a numerical model, geological model, or flow simulation of the subsurface region, where the model or simulation has been constructed or improved using the methods and aspects disclosed herein. At block 134 the presence and/or location of hydrocarbons in the subsurface region is predicted, or alternatively an extraction location may be predicted or estimated. At block 136 hydrocarbon extraction is conducted to remove hydrocarbons from the subsurface region, which may be accomplished by drilling a well 122 using oil drilling equipment 124 (FIG. 12). Other hydrocarbon management activities may be performed according to known principles.

There is thus provided a method of generating an unstructured grid and a method of simulating a reservoir together with their respective apparatus. An advantage is that it provides a more accurate model of complex sub-surface reservoirs comprising faults. It is believed that this provides an important advance in reservoir modeling.

It should be appreciated by those skilled in the art that the concepts and specific embodiments disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

The invention claimed is:

1. A method of generating a three-dimensional reservoir model simulation grid and extracting hydrocarbons from a subsurface earth volume comprising:
   a) first, providing, with a computer system, a geological model comprising horizons, modeling constraints and multiple geological grid cells and a plurality of pillars, wherein the geological model is a representation of the subsurface earth volume in three dimensions;
   b) second, constructing, with the computer system, a pre-image corresponding to the multiple geological grid cells, said pre-image comprising a two dimensional surface representative of areal geometry of the geological model, said modeling constraints being mapped onto said two dimensional surface;
   c) third, generating, with the computer system, a constrained two-dimensional grid on the pre-image with the computer system, the constrained two-dimensional grid comprising multiple grid cells;
   d) fourth, selecting, with the computer system, simulation layer boundaries associated with a plurality of simulation layers from said geological model and projecting the constrained two-dimensional grid onto said simulation layer boundaries, wherein the constrained two-dimensional grid cells comprise identifiers corresponding to the grid cells of the geological model, wherein the grid cells are projected along k-direction lines of the multiple geological grid cells, wherein each k-direction line is along one of the plurality of pillars, and wherein each of the plurality of simulation layers is comprised of major depositional surfaces that are nearly horizontal, fault surfaces which can have arbitrary spatial size and orientation, or detailed stratigraphic layers;
   e) fifth, generating, with the computer system, prismatic cells from the constrained two-dimensional grid to form the three-dimensional reservoir model simulation grid;
   f) sixth, outputting, with the computer system, the three-dimensional reservoir model simulation grid;
   g) seventh, predicting, with the computer system, presence or location of hydrocarbons, or predicting or estimating an extraction location in the subsurface earth volume; and
   h) eighth, extracting hydrocarbons based on the three-dimensional reservoir model simulation grid using oil drilling equipment.

2. The method of claim 1, wherein the pre-image is constructed by
   i) selecting a parametric space corresponding to a base horizon, said parametric space comprising multiple vertices; and
   ii) moving said vertices to correspond with a location of the constraints in said geological model.

3. The method of claim 2, wherein the constraints are approximated in a three-dimensional space of the geological model and the constraints are mapped onto the pre-image.

4. The method of claim 3, wherein the pre-image is adjusted to match the constraints.

5. The method of claim 4, wherein edges of the constrained two-dimensional grid on the pre-image are matched to corresponding constraints on the pre-image.

6. The method of claim 1, wherein the pre-image is constructed by
   i) defining a continuous base horizon surface across one or more faults, the faults comprising fault vertices and fault intersections with the base horizon;
   ii) smoothing said continuous base horizon; and
   iii) projecting said continuous base horizon onto a plane to form the pre-image, the pre-image comprising multiple vertices.

7. The method of claim 6, wherein the fault vertices of the base horizon are merged to locate said fault vertices on said continuous base horizon surface.

8. The method of claim 6, wherein the fault vertices on the continuous base horizon surface are located equidistant from the fault intersections of the base horizon on either side of the fault.

9. The method of claim 6, wherein the continuous base horizon is smoothed by moving one or more fault vertices in a k-direction of the geological model.

10. The method of claim 6, wherein the continuous base horizon is projected vertically onto the plane to form the pre-image.

11. The method of claim 1, wherein the constrained two-dimensional grid is a first constrained two-dimensional grid, and further comprising one or more additional constrained two-dimensional grids that are generated on the pre-image, each constrained two-dimensional grid being assigned to a model zone.

12. The method of claim 11, wherein prismatic cells are generated in separate model zones from separate constrained two-dimensional grids.

13. The method of claim 12, wherein split-faces of prismatic cells from different model zones are calculated on the horizons separating said zones.

14. The method of claim 1, further comprising geometrically merging a plurality of prismatic cells to neighboring prismatic cells based on thickness or volume.

15. The method of claim 1, wherein split-faces of prismatic cells are computed along all fault surfaces.

16. The method of claim 1, wherein the modeling constraints comprise one or more of internal constraints and external constraints, said constraints comprising modeling constraints for simulation grid generation representing subsurface reservoir elements, said internal constraints being included in the geological model and said external constraints comprising modeling constraints ancillary to the geological model.

17. The method of claim 1, further comprising managing hydrocarbons in a hydrocarbon reservoir using the three-dimensional simulation grid.

18. A method of simulating a reservoir and extracting hydrocarbons from a subsurface earth volume, comprising:
   a) providing, to a computer system, a geological model comprising horizons, modeling constraints and multiple geological grid cells and a plurality of pillars, wherein the geological model is a representation of the subsurface earth volume in three dimensions;
   b) constructing, with the computer system, a pre-image corresponding to the multiple geological grid cells, said pre-image comprising a two dimensional surface representative of the areal geometry of the geological model, said modeling constraints being mapped onto said two dimensional surface;
   c) generating, with the computer system, a constrained two-dimensional grid on the pre-image with the computer system, the constrained two-dimensional grid comprising multiple grid cells;
   d) selecting, with the computer system, simulation layer boundaries associated with a plurality of simulation layers from said geological model and projecting the constrained two-dimensional grid onto said simulation layer boundaries, where the constrained two-dimensional grid cells comprise identifiers corresponding to the grid cells of the geological model, wherein the grid cells are projected along k-direction lines of the multiple geological grid cells, wherein each k-direction line is along one of the plurality of pillars, and wherein each of the plurality of simulation layers is comprised of major depositional surfaces that are nearly horizontal, fault surfaces which can have arbitrary spatial size and orientation, or detailed stratigraphic layers;
   e) generating, with the computer system, prismatic cells from the constrained two-dimensional grid to form a three-dimensional simulation grid;
   f) transferring, with the computer system, reservoir properties to the three-dimensional simulation grid;
   g) defining, with the computer system, at least one of state variables and state parameters for each grid cell in the three-dimensional simulation grid;
   h) simulating, with the computer system, physical and chemical processes related to hydrocarbon production on the three-dimensional simulation grid;
   i) predicting, with the computer system, the presence or location of hydrocarbons, or predicting or estimating an extraction location in the subsurface earth volume, and
   j) extracting hydrocarbons based on the three-dimensional simulation grid using oil drilling equipment.

19. A hydrocarbon extraction apparatus comprising: a simulation gridding computer generating a three-dimensional reservoir model simulation grid comprising:
   a) a computer memory storing a geological model comprising horizons, modeling constraints and multiple geological grid cells and a plurality of pillars, wherein the geological model is a representation of a subsurface earth volume in three dimensions;
   b) the computer memory further storing a pre-image corresponding to the multiple geological grid cells, said pre-image comprising a two dimensional surface representative of areal geometry of the geological model, said modeling constraints being mapped onto said two dimensional surface;
   c) a computer processor generating a constrained two-dimensional grid on the pre-image, the two-dimensional grid comprising multiple grid cells;
   d) the computer memory further storing simulation layer boundaries associated with a plurality of simulation layers from said geological model and the computer processor projecting the constrained two-dimensional grid onto said simulation layer boundaries, wherein the constrained two-dimensional grid comprise identifiers corresponding to the geological grid cells, wherein the grid cells are projected along k-direction lines of the geological grid cells, wherein each k-direction line is along one of the plurality of pillars, and wherein each simulation layer is comprised of major depositional surfaces that are nearly horizontal, fault surfaces which can have arbitrary spatial size and orientation, or detailed stratigraphic layers;

e) the computer processor further generating prismatic cells from the constrained two-dimensional grid and forming the three-dimensional reservoir model simulation grid; and f) the computer processor further predicting presence and location of hydrocarbons, and an extraction location in a subsurface earth volume according to the three-dimensional reservoir model simulation grid; and a drilling well comprising a drill string applied to the subsurface earth volume at the location of hydrocarbons predicted by the computer processor according to the three-dimensional reservoir model simulation grid and conducting hydrocarbon removal from the location.

20. The apparatus of claim 19, wherein the two-dimensional grid cells comprise identifiers corresponding to the grid cells of the geological model.

21. The apparatus of claim 19, wherein the modeling constraints comprise at least one of internal constraints and external constraints, the internal constraints comprising modeling constraints for simulation grid generation representing subsurface reservoir elements, and the external constraints comprising modeling constraints ancillary to the reservoir.

* * * * *